United States Patent [19]
Heyward et al.

[11] Patent Number: 5,654,988
[45] Date of Patent: Aug. 5, 1997

[54] APPARATUS FOR GENERATING A PULSE CLOCK SIGNAL FOR A MULTIPLE-STAGE SYNCHRONIZER

[75] Inventors: Deborah J. Heyward, Hillsboro; Joseph E. Batz, Beaverton; Milind A. Karnik, Aloha; R. Tim Frodsham, Portland, all of Oreg.

[73] Assignee: Intel Corporation, Santa Clara, Calif.

[21] Appl. No.: 536,798

[22] Filed: Sep. 29, 1995

[51] Int. Cl.$^6$ .................................................. H04L 7/00
[52] U.S. Cl. ...................... 375/355; 375/375; 326/93; 327/144; 377/78
[58] Field of Search ............................ 375/371, 373, 375/375, 354, 355, 257, 239, 356; 326/93, 104; 327/144–145, 152, 154, 368, 100, 164, 141, 298; 377/73, 78; 371/1

[56] References Cited

U.S. PATENT DOCUMENTS

| 4,320,473 | 3/1982 | Smither et al. | 375/373 |
| 4,973,860 | 11/1990 | Ludwig | 327/145 |
| 4,982,110 | 1/1991 | Yokogawa et al. | 375/359 |
| 5,185,768 | 2/1993 | Ferraiolo et al. | 375/373 |

OTHER PUBLICATIONS

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

*Primary Examiner*—Stephen Chin
*Assistant Examiner*—Don Vo
*Attorney, Agent, or Firm*—Blakely, Sokoloff, Taylor & Zafman

[57] ABSTRACT

An apparatus for generating a pulse clock signal for a multiple-stage synchronizer provides a pulse clock signal to a synchronizer. The synchronizer synchronizes data received in a first clock domain, which is referenced to a first clock signal, to a second clock domain, which is referenced to a second clock signal. The apparatus includes a synchronization pulse generator and a multiplexer. The synchronization pulse generator generates a synchronization pulse based on the first clock signal and the second clock signal. The multiplexer outputs one of either the first clock signal or the synchronization pulse as the pulse clock signal based on an input control signal.

10 Claims, 6 Drawing Sheets

APPARATUS FOR GENERATING A PULSE CLOCK SIGNAL FOR A MULTIPLE-STAGE SYNCHRONIZER

BACKGROUND OF THE INVENTION

1. Field of the Invention

The present invention pertains to signal synchronization. More particularly, this invention relates to generating a pulse clock signal for the first stage of a synchronizer.

2. Background

Computer technology is continuously advancing, resulting in modern computer systems which provide ever-increasing performance. As computer systems become more advanced, more and more components are being added to computer systems and the number of transistors within these components is ever-increasing.

One artifact of increasing computer system components and transistors is the generation of multiple clock signals. Different components within the computer system are typically driven by (also referred to as "referenced to") clock signals having different frequencies. Components which are driven by a particular clock signal are referred to as operating in the clock domain of that particular clock signal.

In addition, different functional blocks within the components may also be driven by clock signals having different frequencies. For example, a computer system may include a processor coupled to a bus and an interrupt controller, where the interrupt controller generates signals on a serial bus which is referenced to a first clock signal, the bus is referenced to a second clock signal, and the processor core is referenced to yet a third clock signal.

Synchronizers are typically used in computer systems to allow different components operating in different clock domains to communicate with one another. When a component operating in a first clock domain sends a signal to a component operating in a second clock domain, the signal is sent through a synchronizer so that the timing of the signal is synchronized to the second clock domain.

Typically, synchronizers ensure that a signal received by the synchronizer is passed to the targeted clock domain to be seen by the targeted component. However, due to the synchronization process, synchronizers typically do not ensure that the signal will be seen by the targeted component on a particular clock edge. For example, data which comes to the synchronizer close to an edge of the targeted clock domain's clock signal will be seen by the targeted agent either on that clock edge or on the next clock edge. However, a guarantee of which clock edge the data will be seen on cannot typically be made.

In many circumstances, the exact timing of a signal being synchronized is not critical. For example, assume an interrupt controller is operating in a first clock domain and is asserting an interrupt signal to a processor coupled to a bus, and that the bus is operating in a second clock domain. The interrupt signal is synchronized to the bus clock domain by a synchronizer for interpretation by the processor. Timing of the interrupt signal is not critical in this example because the processor functions properly regardless of whether it receives the interrupt signal on a first clock pulse or on the subsequent clock pulse.

However, in some situations, the exact timing of a signal being synchronized is critical. For example, some computer systems operate in a functional redundancy checking (FRC) mode. In FRC mode, one processor (referred to as a checker processor) operates to check the performance of a second processor (referred to as a master processor). The checker processor receives the same signals from the bus as the master processor and performs the same calculations as the master processor. The checker processor, however, does not output signals on the bus. Rather, the checker processor compares the output signals it would place on the bus to the outputs the master processor does place on the bus. Since the master and checker processors are operating according to the same inputs, a discrepancy between what the checker processor would output and what the master processor does output indicates an error was made by one of the two processors. If such a discrepancy arises, then the checker processor asserts an FRC error signal to indicate that an error has occurred.

Thus, it is important that the two processors operating in FRC mode operate in lock-step. That is, signals received on a particular clock edge by one processor need to be received on the same clock edge by the second processor in order to avoid an improper FRC error signal. However, as discussed above, synchronizers typically do not guarantee that data will be seen by the targeted component on a particular clock edge. Therefore, the master processor could receive the signal on one clock edge and the checker processor could receive the signal on the subsequent clock edge. Thus, it would be beneficial to provide a mechanism for ensuring that signals provided by a synchronizer are available on a particular clock edge.

One method which could be used to resolve the synchronization problem between the first and second clock domains is to enforce very stringent timing requirements on the two clock domains when operating in a mode which requires a guarantee of when a signal will be seen (e.g., when operating in FRC mode). However, such stringent requirements create significant difficulties and expenses for system designers. These requirements are made even more difficult to satisfy due to slight differences in timing as a result of process, voltage, and temperature variances. Thus, it would be beneficial to provide a mechanism which ensures signals provided by a synchronizer are available on a particular clock edge without overburdening system designers. Additionally, it would be beneficial to provide a mechanism which ensures signals provided by a synchronizer are available on a particular clock edge, while at the same time does not adversely affect system performance in modes which do not require signals provided by a synchronizer to be available on a particular clock edge.

Furthermore, many integrated circuit (IC) devices include large numbers of transistors. The design and construction of such IC devices is both time and cost intensive. Additionally, stocking larger numbers of different types of IC devices results in increased costs. Thus, it would be beneficial to provide a mechanism which provides consistent synchronization in both systems which require synchronizers to provide signals on a particular clock edge and systems which do not require synchronizers to provide signals on a particular clock edge.

The present invention provides for these and other advantageous results.

SUMMARY OF THE INVENTION

An apparatus for generating a pulse clock signal for a multiple-stage synchronizer is described herein. The apparatus provides the pulse clock signal to a synchronizer. The synchronizer synchronizes data received in a first clock domain, which is referenced to a first clock signal, to a second clock domain, which is referenced to a second clock signal. The apparatus includes a synchronization pulse generator and a multiplexer. The synchronization pulse generator generates a synchronization pulse based on the first clock signal and the second clock signal. The multiplexer outputs one of either the first clock signal or the synchronization pulse as the pulse clock signal based on an input control signal.

In one embodiment, the synchronization pulse generator includes a first latch, a logical AND device, and a second latch. The first latch has a data input coupled to the first clock signal and a clock input coupled to the second clock signal, the logical AND device has a first input coupled to the first clock signal and a second input coupled to an output of the first latch, and the second latch has a data input coupled to the output of the logical AND device and a clock input coupled to the second clock signal. In this embodiment, the output of the second latch is the synchronization pulse.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention. It should be noted that the present invention can be practiced in a variety of manners, such as by fabrication by silicon or gallium arsenide or other processes.

In the descriptions which follow reference is made to high states and low states. A low state typically represents a voltage of between 0.0 and 0.5 volts. When a particular signal or node is in a low state, the signal or node is referred to as being a "0". A high state typically represents a voltage of between 1.8 and 5.5 volts. When a particular signal or node is in a high state, the signal or node is referred to as being a "1". It is to be appreciated, however, that the voltages which represent low and high states can be different than the ranges mentioned above.

Reference is also made in the descriptions which follow to particular signal names. It is to be appreciated that these signal names have been provided for convenience and are not to be construed as a limitation of the present invention.

Reference is also made in the descriptions which follow to FRC mode. FRC mode refers to two processors operating in lock-step, one being a master processor and the second being a checker processor. The checker processor compares the outputs of the master processor to the outputs the checker processor generates and asserts an FRC error signal if there is a discrepancy, thereby indicating to an error control unit that an error occurred in one of the two processors. Additionally, reference is also made herein to "asynchronous mode". Asynchronous mode refers to a non-FRC mode (for example, multiple processors which are not required to be in lock-step).

Figure 1:
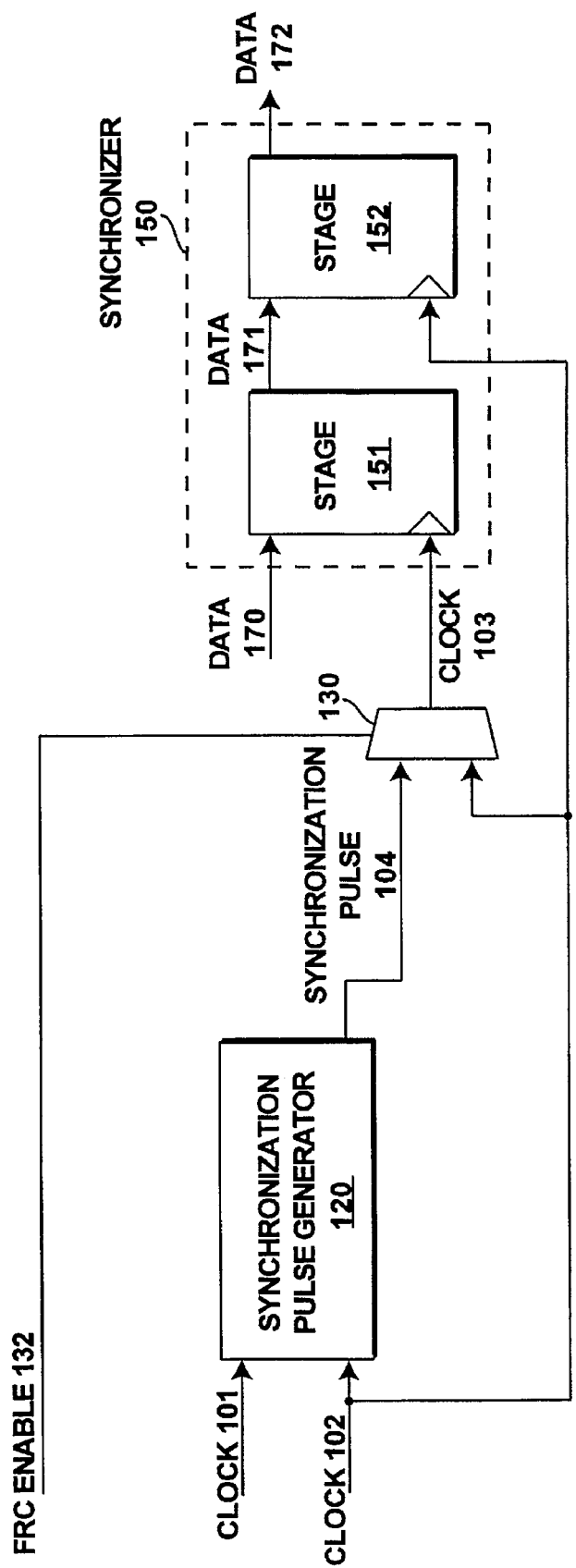
FIG. 1 is a block diagram showing pulse generation logic according to one embodiment of the present invention coupled to a synchronizer.

FIG. 1 is a block diagram showing pulse generation logic according to one embodiment of the present invention coupled to a synchronizer. A synchronization pulse generator 120, multiplexer 130, and synchronizer 150 are shown in FIG. 1.

Synchronizer 150 is a two-stage synchronizer, including stage 151 and stage 152. Synchronizer 150 synchronizes input signals from a source clock domain to a target clock domain. In one embodiment, the source clock domain is referenced to clock signal 101 and the target clock domain is referenced to clock signal 102. An input signal which is to be synchronized to a component in the target clock domain is input to synchronizer 150 as data signal 170. Data signal 170 is input to stage 151 of synchronizer 150. The output of stage 151 is data signal 171, which is input to stage 152. The output of stage 152 is data signal 172, which is the signal input as data signal 170 now synchronized to the target clock domain.

In one embodiment of the present invention, stage 151 and stage 152 both operate as conventional D-type flip-flops. In another embodiment of the present invention, stage 151 and stage 152 both operate as conventional metastable-immune D-type flip-flops. However, it is to be appreciated that any of a wide variety of conventional latches can be used as stage 151 and stage 152.

In the embodiment shown, stage 152 is referenced to the clock signal of the target domain and stage 151 is referenced to clock signal 103. Clock signal 103 is the output of multiplexer 130. Clock signal 103 is either clock signal 102 or synchronization pulse signal 104, as discussed in more detail below.

Synchronization pulse generator 120 generates a synchronization pulse signal 104 based on clock signal 101 and clock signal 102, as discussed in more detail below. Synchronization pulse signal 104 and clock signal 102 are both input to multiplexer 130. Which of these two input signals is output by multiplexer 130 as clock signal 103 is dependent on the FRC enable signal 132.

The FRC enable signal 132 indicates whether the synchronizer 150 is synchronizing signals in a system operating in FRC mode or in asynchronous mode. When the FRC enable signal 132 is in a first state (e.g., a "0"), the system is operating in asynchronous mode, and when the FRC enable signal 132 is in a second state (e.g., a "1"), the system is operating in FRC mode. When in FRC mode, multiplexer 130 outputs synchronization pulse 104 as clock signal 103. However, when the system is in asynchronous mode, multiplexer 130 outputs clock signal 102 as clock signal 103.

In one embodiment of the present invention, a signal is asserted at system reset to indicate whether the system is operating in FRC mode or asynchronous mode. This signal is asserted by power-on logic within the system. In one implementation, the power-on logic is included in a bus bridge in the system. Whether the system is operating in FRC or asynchronous mode can be determined in any of a wide variety of conventional manners. For example, the placement of a jumper in the system, a configuration bit stored in a Flash memory device, or similar means could be used to indicate whether the system is operating in FRC mode.

It is to be appreciated that the description of signal 132 as an FRC enable signal is exemplary only. The FRC enable signal 132 is used to indicate whether stage 151 of synchronizer 150 should be referenced to clock signal 102 or synchronization pulse 104. Any of a wide variety of input control signals can be used to control multiplexer 130. The present invention can assert synchronization pulse 104 as clock signal 103 in response to any one of these input control signals.

The synchronizer 150 as shown is for a single bit of data as data signal 170. However, it is to be appreciated that multiple bits of parallel data can be accommodated by duplicating synchronizer 150 for each additional bit. Each of these additional bits can be driven by clock signal 103.

It is to be appreciated that although synchronizer 150 is shown as a two-stage synchronizer, the present invention is equally applicable to a synchronizer having more than two stages. In a synchronizer having more than two stages, the clock signal 103 is input as the clock input to the first stage of the synchronizer and the inputs to the other two or more stages remain unchanged.

In one embodiment of the present invention, when operating in asynchronous mode, the clock signals 101 and 102 can be totally asynchronous and do not need to satisfy any ratio requirements. In this embodiment, when operating in FRC mode, the clock signal 101 frequency to clock signal 102 frequency ratio is 1:X, for integer values of X greater than or equal to four. In one implementation, when operating in asynchronous mode clock signal 101 is a 16 Mhz clock signal and clock signal 102 is a 75 Mhz clock signal, however, when operating in FRC mode, clock signal 101 is an 18.75 Mhz clock signal and clock signal 102 is a 75 Mhz clock signal. However, it is to be appreciated that the present invention can synchronize signals between any of a wide range of different clock frequencies.

Figure 2:
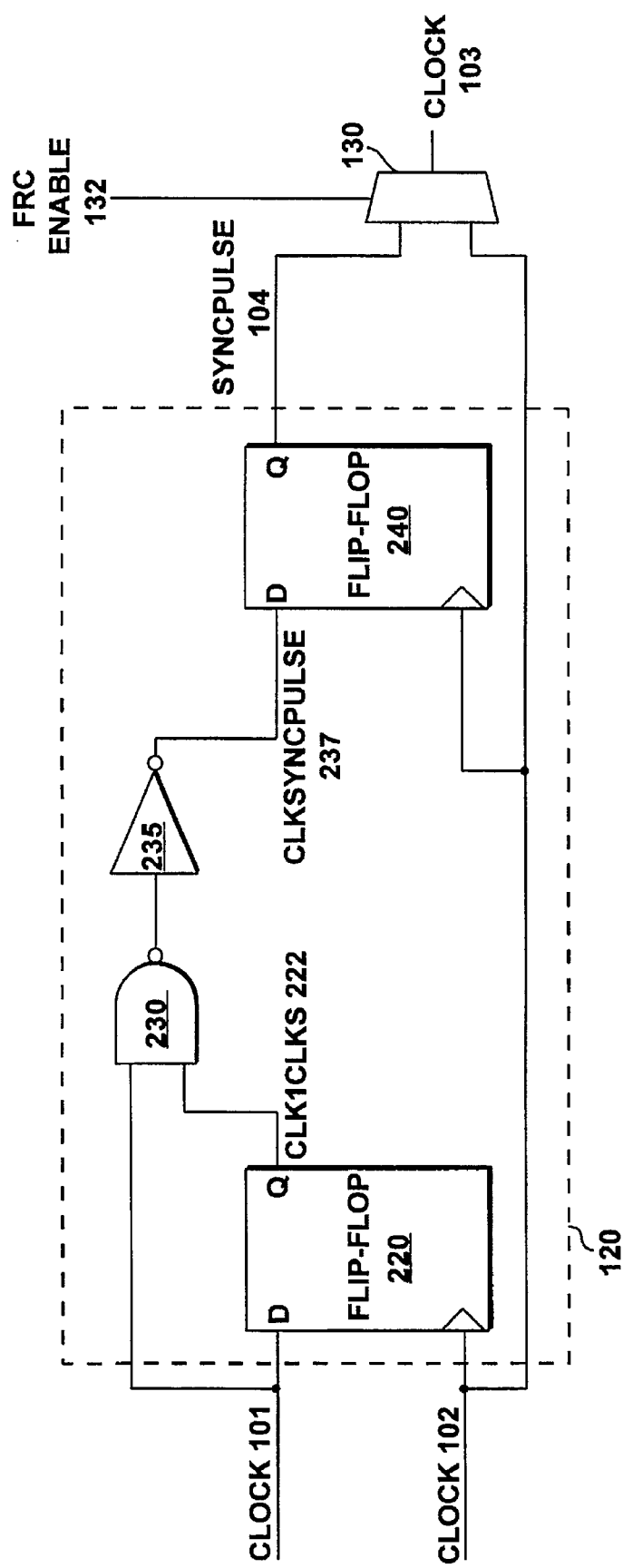
FIG. 2 is a circuit diagram showing the pulse generation logic according to one embodiment of the present invention.

FIG. 2 is a circuit diagram showing the pulse generation logic according to one embodiment of the present invention. Clock signal 102 is input to both synchronization pulse generator 120 and multiplexer 130. When FRC enable signal 132 is in a first state (e.g., indicating asynchronous mode), then multiplexer 130 outputs clock signal 102 as clock signal 103. Thus, the synchronization pulse signal 104 is ignored by multiplexer 130 when in asynchronous mode. However, it is to be appreciated that synchronization pulse generator 120 generates the synchronization pulse signal 104, even when the system is operating in asynchronous mode.

Synchronization pulse generator 120 as shown includes a flip-flop 220 and a flip-flop 240. Clock signal 102 is input to flip-flop 220 as the clock input. Clock signal 101 is input to flip-flop 220 as the data input. Flip-flop 220 outputs a signal CLK1CLKS 222. Clock signal 101 is also input to logical NAND gate 230 along with CLK1CLKS 222. The output of logical NAND gate 230 is input to I0 inverter 235, thereby generating a logical AND device. Inverter 235 outputs a signal CLKSyncPulse 237. CLKSyncPulse 237 is input to flip-flop 240 as the data input. Clock signal 102 is also input to flip-flop 240 as the clock input. The output of flip-flop 240 is synchronization pulse signal 104, which is input to multiplexer 130.

In one embodiment of the present invention, flip-flop 220 and flip-flop 240 are both conventional D-type flip-flops. However, it is to be appreciated that any of a wide variety of conventional latches can be used as flip-flops 220 and 240.

Thus, flip-flops 220 and 240, along with the logical AND device, generate the synchronization pulse signal 104. When in FRC mode, multiplexer 130 outputs synchronization pulse signal 104 as clock signal 103 rather than clock signal 102.

In one embodiment of the present invention, clock signal 102 is the clock input of flip-flop 240 and the target clock domain is the clock signal input to both multiplexer 130 and stage 152 of synchronizer 150. Thus, in this embodiment, the clock signal inputs are as shown in FIGS. 1 and 2 when the source clock domain is referenced to clock signal 101 and the target clock domain is referenced to clock signal 102. However, when the source clock domain is referenced to clock signal 102 and the target clock domain is referenced to clock signal 101, then clock signal 102 is the clock signal input to flip-flop 240, and clock signal 101 is the clock signal input to both multiplexer 130 and stage 152 of synchronizer 150.

Figure 3:
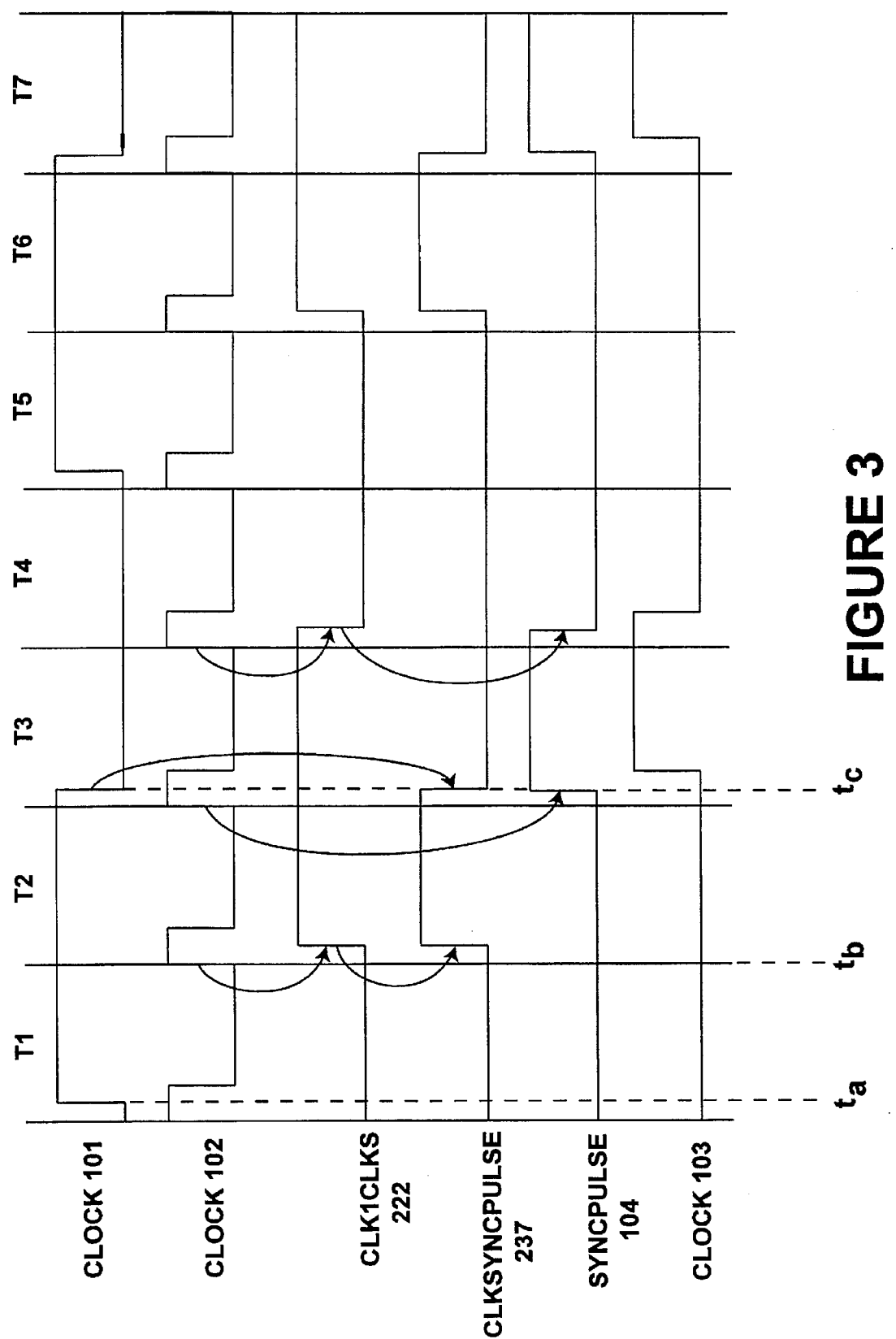
FIG. 3 is a timing diagram showing the timing for the signals used in generating a pulse according to one embodiment of the present invention.

FIG. 3 is a timing diagram showing the timing for the signals used in generating a pulse according to one embodiment of the present invention. Clock signal 101 and clock signal 102 are the clock signals of the source and target clock domains, respectively. As shown in FIG. 3, clock signal 102 has a frequency four times that of clock signal 101.

In the embodiment shown in FIG. 3, data is latched into flip-flops 220 and 240 of FIG. 2 on the rising edge of clock signal 102. The rising edge refers to the time when the clock signal 102 is transitioning from a low state to a high state.

Clock signal 101 initially transitions high in T1 and remains high until T3. Clock signal 102 provides a clock pulse in each time T1–T7. When clock signal 102 transitions high in T2, CLK1CLKS 222 and CLKSyncPulse 237 transition high. Thus, the data input to flip-flop 240 is in a high state, ready to be latched in on the next rising edge of clock signal 102. It should be noted that CLK1CLKS 222 and CLKSyncPulse 237 transition high a short period of time after the rising edge of clock signal 102 due to signal propagation delays within the circuit and the flip-flop 220.

When clock signal 102 next transitions high, in T3, flip-flop 240 latches in the data on CLKSyncPulse 237 (which is now in a high state). This is output by flip-flop 240 as synchronization pulse 104. Multiplexer 130 then outputs synchronization pulse 104 as clock signal 103 in T3. Note that clock signal 103 transitions high a short period of time after synchronization pulse 104 transitions high due to signal propagation delays in multiplexer 130 and flip-flop 240.

Also in T3, clock signal 101 transitions to a low state. This causes CLKSyncPulse 237 to transition to a low state due to logical NAND gate 230 and inverter 235. Note, however, that CLK1CLKS 222 remains high in T3. In T4, the rising edge of clock signal 102 causes CLK1CLKS 222 to transition to a low state. This process repeats itself starting again in T5.

Thus, when in FRC mode, stage 151 of synchronizer 150 is clocked by synchronization pulse signal 104 rather than clock signal 102. The synchronization pulse signal 104 has a rising edge generated three clocks after the rising edge of clock signal 101. The data is being received from the clock domain referenced to clock signal 101, therefore, data should be stable by the time the synchronization pulse signal 104 occurs.

The present invention ensures that data which arrives close to a clock edge is seen on a particular clock edge. For example, data is asserted in the source clock domain on the rising edge of clock signal 101. However, data may be asserted at time $t_a$ but not become stable until close to time $t_b$. If data were to become stable close to time $t_b$, and the first stage of the synchronizer were clocked by clock signal 102, then the data would be available to the second stage of the synchronizer in either T2 or T3, and output in the target clock domain in either T3 or T4. However, given the pulse generation logic of the present invention, data which is stable at time $t_b$ is stable in time for the synchronization pulse signal 104 in time T3. Thus, the data is ensured to be available in time T3, and is available to the second stage of the synchronizer in time T4, thereby ensured to be available in the target clock domain in T5. Thus, the data is ensured to be available at a particular clock edge, rather than one of two clock edges.

Thus, the present invention provides a much longer setup time for data coming from the source domain. It is to be appreciated that the synchronization pulse generator ensures data is available at a particular clock edge, provided the data is available in the source clock domain prior to time $t_c$.

Figure 4:
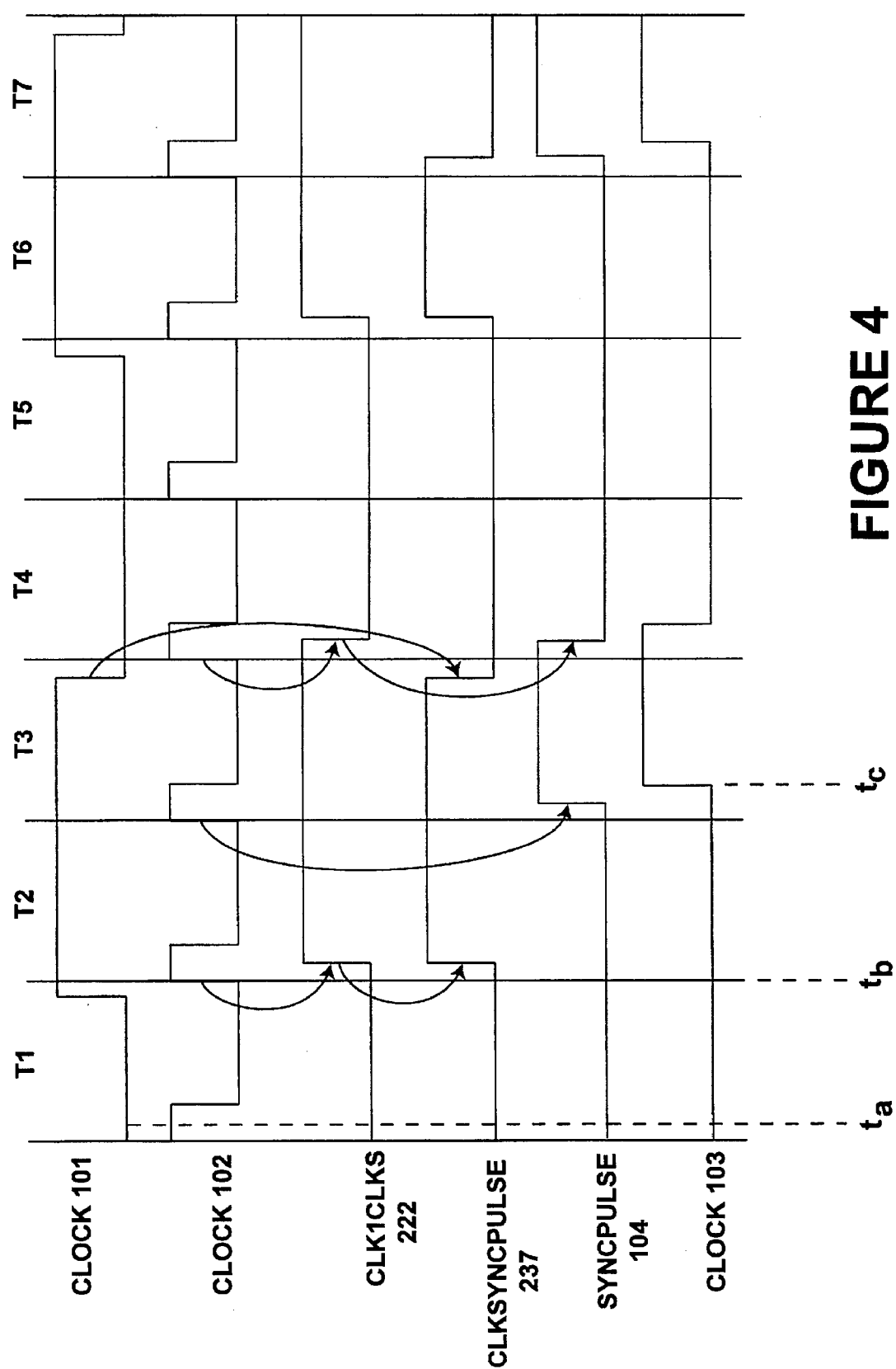
FIG. 4 is a timing diagram showing clock skew between two clock signals which can exist according to one embodiment of the present invention.

In addition, the present invention allows a wider variance in skew between the source clock signal and the target clock signal, thereby placing less stringent requirements on system designers and allowing for more process variations. For example, clock signal 101 may be skewed with respect to clock signal 102 as shown in FIG. 4. However, even given the large clock skew shown, the pulse generation logic of the present invention ensures data is available at a particular clock edge if the data is available prior to the next rising edge of clock signal 102 in T2.

Thus, the present invention generates a synchronization pulse 104 which is synchronous with the clock signal of the target clock domain (clock signal 102). This synchronization is maintained even while allowing for a wide variance in skew between the source and target clock domain clock signals.

It is to be appreciated that although the above descriptions discuss latches being activated on the rising clock edge, the present invention can use latches which are triggered on the falling clock edge.

Figure 5:
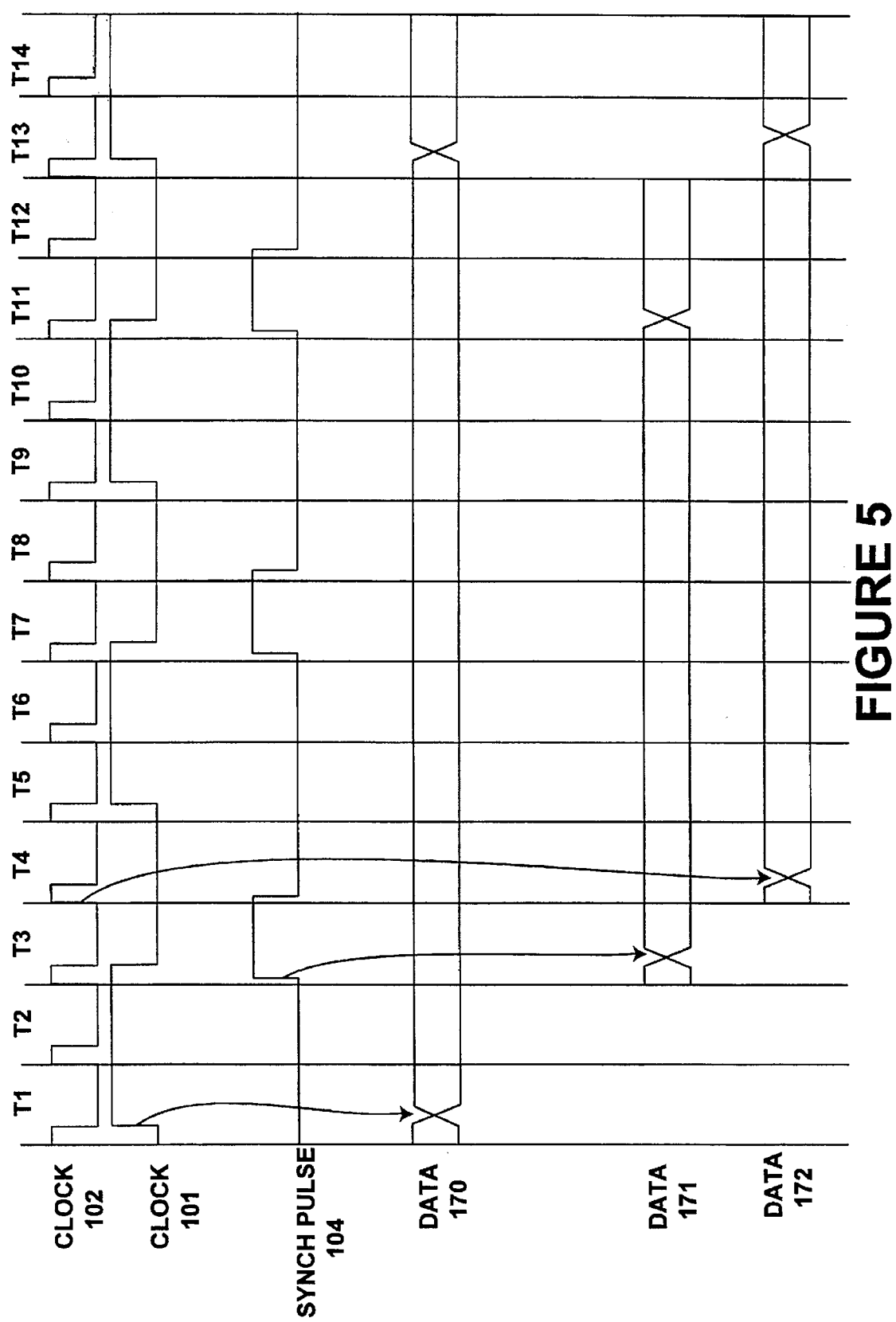
FIG. 5 is a timing diagram showing the timing for transferring signals between two clock domains according to one embodiment of the present invention.

FIG. 5 is a timing diagram showing the timing for transferring signals between two clock domains according to one embodiment of the present invention. In the embodiment shown in FIG. 5, synchronization pulse generator 120 of FIG. 1 is used to generate a synchronization pulse 104 for synchronizing data from a clock domain referenced to clock signal 101 to a clock domain referenced to clock signal 102. In the embodiment shown, the synchronization pulse 104 is driving stage 151 of synchronizer 150.

Data is provided as data signal 170 in the clock signal 101 clock domain in time T1. A synchronization pulse signal 104 is generated in time T3 in the same manner as discussed above. The synchronization pulse signal 104 clocks stage 151, causing the data to be available as data signal 171 in time T3. Clock signal 102 clocks stage 152 in time T4, thereby causing the data to be available as data signal 172 in time T4.

It should be noted that in the timing diagram of FIG. 5, the target clock domain is referenced to a clock signal which is four times the frequency of the clock signal to which the source clock domain is referenced. Thus, the 4:1 frequency ratio is maintained. It is to be appreciated that the target clock domain can be either clock signal 101 or clock signal 102, however, the clock signal 102 to clock signal 101 ratio should be 4:1 or greater regardless of which clock signal is the target clock domain.

Figure 6:
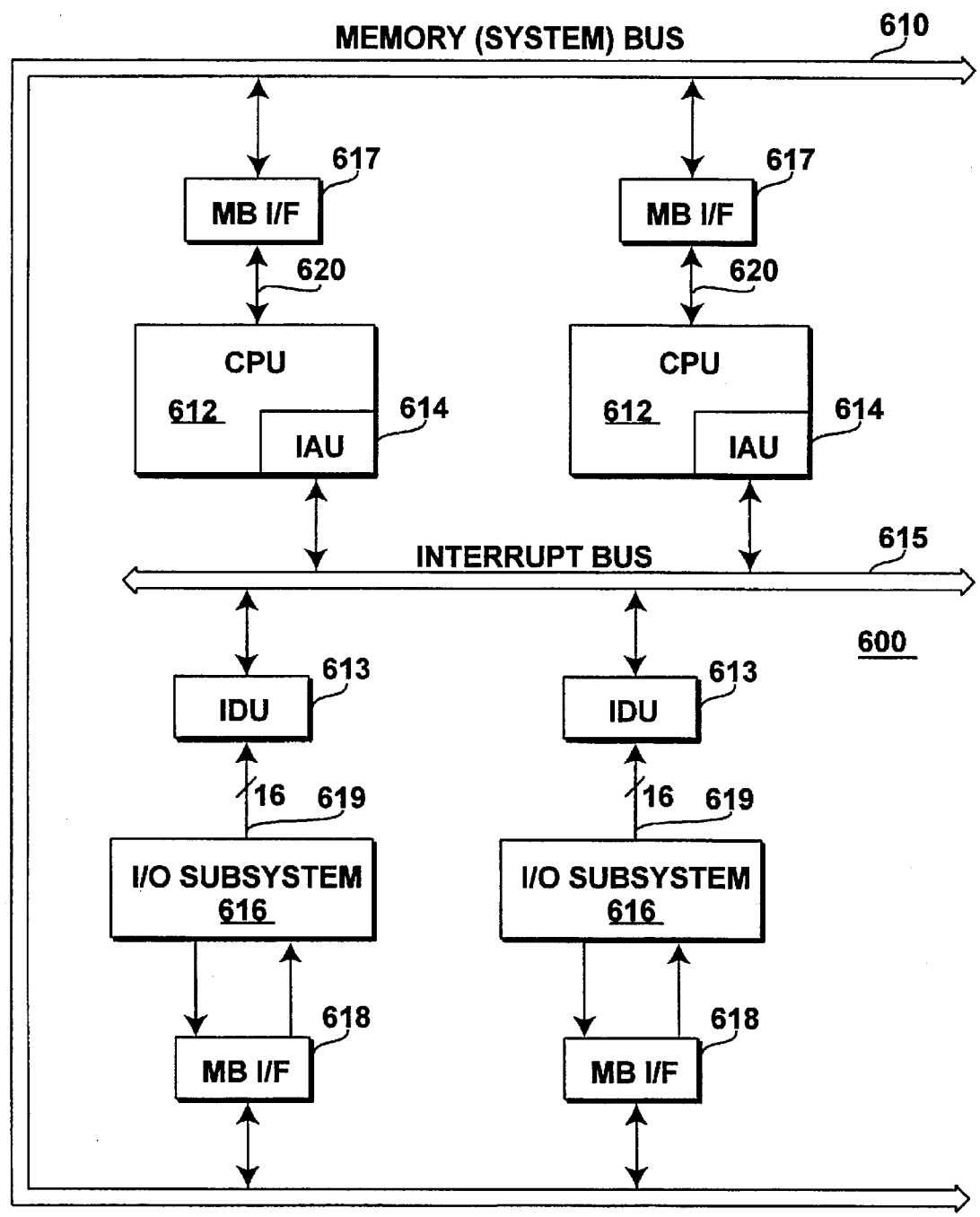
FIG. 6 is a block diagram of a computer system such as may be used with one embodiment of the present invention.

FIG. 6 is a block diagram of a computer system such as may be used with one embodiment of the present invention. FIG. 6 shows a system 600 including four major parts: a memory (or system) bus 610; an interrupt bus 615; a multiplicity of processor units (CPUs) 612 coupled to memory bus 610 via memory bus interface (MBI/F) 617 and to interrupt bus 615 via interrupt acceptance units (IAUs) 614; and at least one I/O subsystem 616 coupled to memory bus 610 via memory bus interface (MBI/F) 618 and to interrupt bus 615 via interrupt delivery unit (IDU) 613.

I/O subsystem 616 may be a single device with multiple interrupt request (IRQ) lines coupled to IDU 613 or a collection of devices, each with one or more IRQ lines 619. In one embodiment, each IDU 613 can accommodate up to sixteen IRQ input lines. Consequently, MBI/F 618 may be a single or a multiple interface unit for coupling I/O subsystems 616 to memory bus 610.

In one embodiment, IAU 614 is resident on the CPU 612 chip. Having IAU 614 on-chip can improve system performance by, for example, allowing some interrupt vectors to be available on-chip rather than requiring the CPU to go off-chip for the interrupt vector. Also, MBI/F 617 may be unnecessary if the CPU bus 620 protocol is compatible with the memory bus 610 protocol.

It should be noted that interrupt bus 615 allows interrupt-related control messages to be routed between system elements. Memory bus 610 is not required for IRQ arbitration, assignment, or acceptance acknowledgment.

Each IDU 613 accepts up to sixteen IRQs on interrupt lines 619 and broadcasts to all IAUs 614 over interrupt bus 615 an appropriately formatted IRQ message for each active IRQ input line. The IRQ message contains all necessary information for identifying the IRQ source and its priority.

Each IAU 614 examines the broadcast message and decides whether to accept it. If the IRQ message is tentatively accepted by more than one IAU, an arbitration procedure is invoked between competing units. The IAU with the highest priority wins the arbitration and accepts the IRQ, pending delivery to its associated CPU. Also, IAU 614 provides nesting and masking of interrupts and handles all interactions with its local processor including the CPU protocol for interrupt request, interrupt acknowledge, and end of interrupt indications.

In one embodiment, IAU 614 also generates interprocessor interrupts for transfer to the other CPUs 612 in system 600.

In one embodiment of the present invention, MBI/Fs 617 (and thus memory bus 610) are referenced to clock signal 102 of FIG. 1 and IDUs 613 and IAUs 614 (and thus interrupt bus 615) are referenced to clock signal 101 of FIG. 1. Thus, interrupt signals received by IAU 614 in the interrupt controller clock domain which need to be provided to components of CPU 612 operating in the memory bus clock domain are synchronized to clock signal 102 as described above.

In one embodiment of the present invention, CPUs 612 are referenced to a processor core clock signal where the bus clock frequency to processor core clock frequency ratio is either 1:n or 2:n. When operating at a ratio of 2:n, the bus clock and interrupt controller clock can be in phase external to the CPUs 612 but out of phase internally. Due to the possibility of the clock signals being out of phase internally, signals from the interrupt controller clock domain cannot be guaranteed to be seen on a particular bus clock edge when synchronized to the bus clock domain, thereby creating a problem when operating in FRC mode. However, the synchronization pulse generated by the present invention allows for a wide variance in skew between the interrupt controller clock and the bus clock, as discussed above. This acceptance of skew variance provided by the synchronization pulse ensures that signals from the interrupt controller clock domain are seen on a particular clock edge when synchronized to the bus clock domain, even if the interrupt controller clock and the bus clock are out of phase internally.

It is to be appreciated that the pulse generation logic of the present invention described above is not limited to generating signals for use in FRC mode. The pulse generating signal of the present invention can be used in any of a wide variety of situations where there is a desire to synchronize signals between two clock domains and to ensure that data input to the synchronizer is seen in the target domain on a particular clock edge.

The above descriptions describe generation of a synchronization pulse signal which is used to synchronize signals between two clock domains at the circuit level. However, it is to be appreciated that the present invention is not limited to the circuit level. For example, the synchronization pulse signal could be used to synchronize signals between two different circuit boards in a computer system.

In one embodiment, the pulse generation circuit of the present invention is implemented using CMOS technology. However, it is to be appreciated that the present invention can be implemented using any of a wide variety of technologies.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, an apparatus for generating a pulse clock signal for a multiple-stage synchronizer has been described.

What is claimed is:

1. An apparatus for providing a pulse clock signal to a synchronizer, wherein the synchronizer synchronizes data received in a first clock domain to a second clock domain, wherein the first clock domain is referenced to a first clock signal and the second clock domain is referenced to a second clock signal, the apparatus comprising:

a synchronization pulse generator configured to generate a synchronization pulse based on the first clock signal and the second clock signal; and a multiplexer having an input coupled to the synchronization pulse generator and an output coupled to a clock input of a first stage of the synchronizer, wherein the multiplexer is configured to output one of either the second clock signal or the synchronization pulse as the pulse clock signal to the first stage of the synchronizer responsive to an input control signal.

2. The apparatus of claim 1, wherein the synchronization pulse generator comprises:

a first latch having a data input coupled to the first clock signal and a clock input coupled to the second clock signal;

a logical AND device having a first input coupled to the first clock signal and a second input coupled to an output of the first latch; and a second latch having a data input coupled to the output of the logical AND device and a clock input coupled to the second clock signal, wherein the synchronization pulse is an output of the second latch.

3. An apparatus for providing a pulse clock signal to a synchronizer, wherein the synchronizer synchronizes data received in a first clock domain to a second clock domain, wherein the first clock domain is referenced to a first clock signal and the second clock domain is referenced to a second clock signal, the apparatus comprising:

a synchronization pulse generator configured to generate a synchronization pulse based on the first clock signal and the second clock signal; and a multiplexer coupled to the synchronization pulse generator configured to output one of either the second clock signal or the synchronization pulse as the pulse clock signal responsive to an input control signal, wherein the input control signal has a first state and a second state, and wherein the first state indicates the apparatus is operating in a functional redundancy checking mode and the second state indicates the apparatus is operating in an asynchronous mode.

4. A synchronization pulse generation circuit for clocking a first stage of a synchronizer, wherein the synchronizer synchronizes data to a first clock signal, wherein the data is referenced to a second clock signal when the data is received by the synchronizer, and wherein the circuit comprises:

a first latch having a data input coupled to the second clock signal and a clock input coupled to the first clock signal;

a NAND gate having a first input coupled to the second clock signal and a second input coupled to an output of the first latch;

an inverter having an input coupled to the output of the NAND gate;

a second latch having a data input coupled to the output of the inverter and a clock input coupled to the first clock signal, wherein an output of the second latch is coupled to a clock input of the first stage of the synchronizer.

5. The circuit of claim 4, further comprising a multiplexer having a first input coupled to the output of the second latch, a second input coupled to the first clock signal, and an output coupled to the clock input of the first stage of the synchronizer.

6. The circuit of claim 5, wherein an input control signal is coupled to the multiplexer, wherein the input control signal has a first state and a second state, and wherein the first state indicates the circuit is operating in a functional redundancy checking mode and the second state indicates the circuit is operating in an asynchronous mode.

7. An apparatus for clocking a first stage of a synchronizer, wherein the synchronizer synchronizes data to a first clock signal, wherein the data is referenced to a second clock signal when the data is received by the synchronizer, and wherein the apparatus comprises:

first means for latching the second clock signal, wherein the first means for latching is responsive to the first clock signal;

means for logically ANDing together the second clock signal and an output of the first means for latching;

second means for latching an output of the means for logically ANDing, wherein an output of the second means for latching is coupled to a clock input of the first stage of the synchronizer; and means for multiplexing having a first input coupled to the output of the second means for latching, a second input coupled to the first clock signal, and an output coupled to the clock input of the first stage of the synchronizer.

8. The apparatus of claim 7, wherein a control means is coupled to the means for multiplexing, wherein the control means has a first state and a second state, and wherein the first state indicates the apparatus is opening in a functional redundancy checking mode and the second state indicates the apparatus is operating in an asynchronous mode.

9. A method for providing a pulse clock signal to a synchronizer, wherein the synchronizer synchronizes data received in a first clock domain to a second clock domain, wherein the first clock domain is referenced to a first clock signal and the second clock domain is referenced to a second clock signal, the method comprising the steps of:

generating a synchronization pulse based on the first clock signal and the second clock signal; and providing, based on an input control signal, one of either the second clock signal or the synchronization pulse to a first stage of the synchronizer as the pulse clock signal.

10. A method in a computer system for providing a pulse clock signal to a synchronizer, wherein the synchronizer synchronizes data received in a first clock domain to a second clock domain, wherein the first clock domain is referenced to a first clock signal and the second clock domain is referenced to a second clock signal, the method comprising the steps of:

generating a synchronization pulse based on the first clock signal and the second clock signal; and providing, based on whether the computer system is operating in a functional redundancy checking mode or an asynchronous mode, one of either the second clock signal or the synchronization pulse to a first stage of the synchronizer as the pulse clock signal.

* * * * *